US009039509B2

(12) United States Patent
Mullins et al.

(10) Patent No.: US 9,039,509 B2
(45) **Date of Patent: *May 26, 2015**

(54) ELECTRONIC GAMING DEVICE WITH BINGO POKER

(75) Inventors: Brendan Michael Mullins, Alpharetta, GA (US); Donald James Rollo, III, Dacula, GA (US); Ray Edward Bornert, II, Snellville, GA (US)

(73) Assignee: Cadillac Jack, Inc., Duluth, GA (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/602,174

(22) Filed: Sep. 2, 2012

(65) Prior Publication Data

US 2014/0066163 A1 Mar. 6, 2014

(51) Int. Cl.

*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.

CPC .................................. *G07F 17/3267* (2013.01)

(58) Field of Classification Search

USPC .............................. 463/11, 18, 19, 21, 42, 43
See application file for complete search history.

(56) References Cited

U.S. PATENT DOCUMENTS

2012/0220356 A1* 8/2012 Gilbertson et al. ............. 463/18

* cited by examiner

*Primary Examiner* — Adetokunbo O Torimiro
(74) *Attorney, Agent, or Firm* — CF 3; Stephen Eisenmann

(57) ABSTRACT

Examples disclosed herein relate to systems and methods, which may utilize bingo mapping gaming options. The systems and methods may include bingo mapping functionality in a Class II environment.

16 Claims, 15 Drawing Sheets

508

| | | | | | |
|---|---|---|---|---|---|
| ROYAL FLUSH | 250 | 500 | 750 | 1000 | 2000 |
| STRAIGHT FLUSH | 100 | 200 | 300 | 400 | 500 |
| FOUR OF A KIND | 80 | 160 | 240 | 320 | 400 |
| FULL HOUSE | 8 | 16 | 24 | 32 | 40 |
| FLUSH | 6 | 12 | 18 | 24 | 30 |
| STRAIGHT | 4 | 8 | 12 | 16 | 20 |
| THREE OF A KIND | 3 | 6 | 9 | 12 | 15 |
| TWO PAIR | 1 | 2 | 3 | 4 | 5 |
| JACKS OR BETTER | 1 | 2 | 3 | 4 | 5 |

520 522 524 526 528 530

ELECTRONIC GAMING DEVICE WITH BINGO POKER

FIELD

The subject matter disclosed herein relates to an electronic gaming device. More specifically, the disclosure relates to an electronic gaming device, which provides gaming options relating to one or more features that map bingo game play to non-bingo games.

Information:

The gaming industry has numerous casinos located both worldwide and in the United States. A client of a casino or other gaming entity can gamble via various games of chance. For example, poker, craps, roulette, baccarat, blackjack, and electronic games (e.g., a slot machine) are games where a person may gamble on an outcome.

An electronic gaming device (e.g., a slot machine) may utilize symbols (e.g., cards) to determine when predetermined winning symbol combinations are aligned in a predetermined pattern (e.g., Jacks or better) to form a winning combination. A winning event occurs when the player successful matches the predetermined winning symbols to one of the predetermined patterns. In this disclosure, one example utilized is for the gaming device and/or the gaming system to deal a five card poker hand to a player in a Class II environment. The player may discard one or more cards, which the gaming device and/or the gaming system may replace (e.g., redraw) with new playing cards. The final five card poker hand would be evaluated against winning outcomes (e.g., a pair or better). In this disclosure, the gaming device and/or the gaming system may provide more excitement by allowing the player to initiate one or more bingo poker features.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
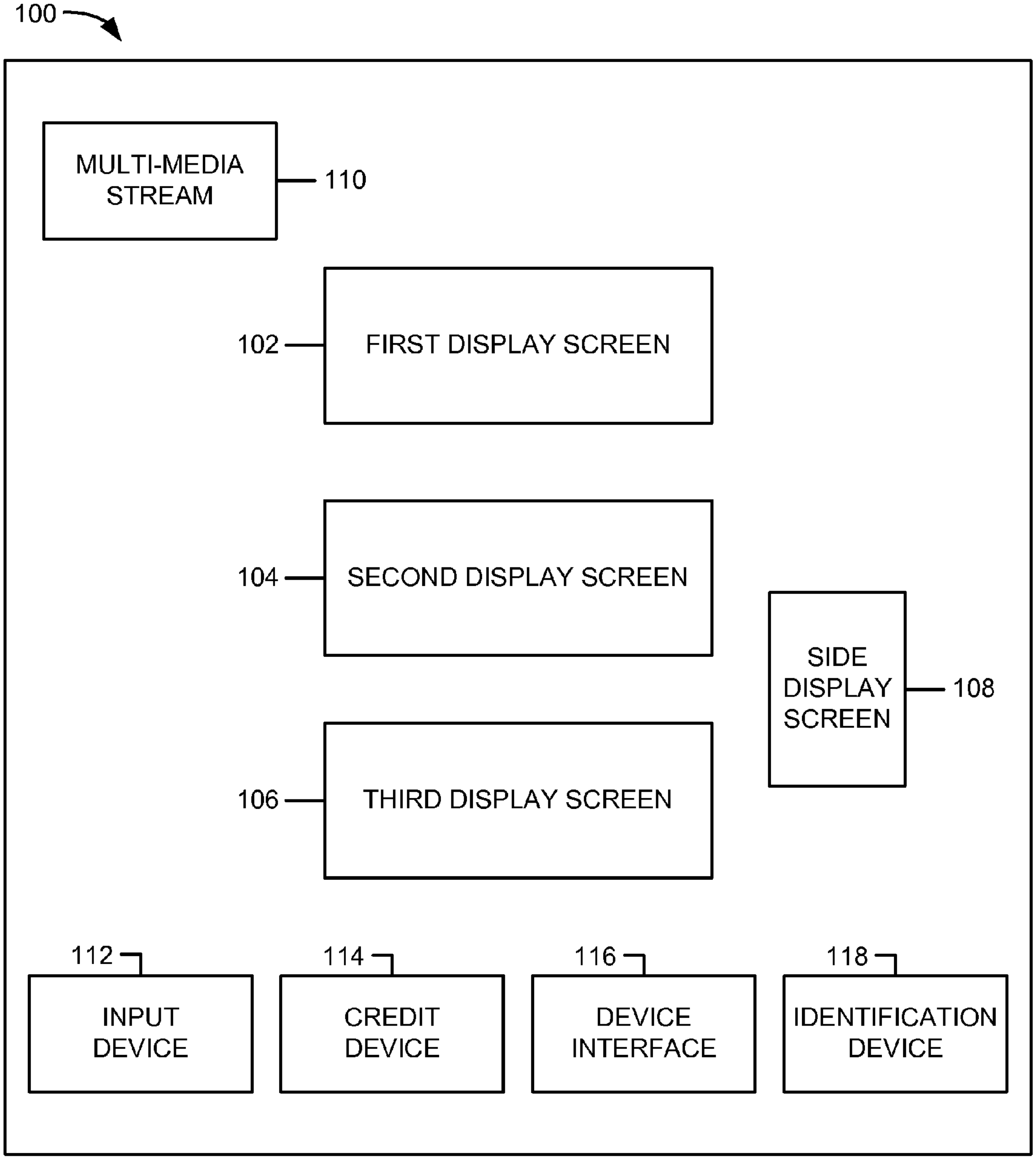
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for the casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (e.g., on-screen) keyboard, a virtual (e.g., on-screen) keypad, biometric sensor, and/or any combination thereof. Input device 112 may be utilized to make a wager, to utilize one or more bingo poker features, to select a symbol (e.g., card) to modify (e.g., draw), to utilize one or more mapped game features, to modify electronic gaming device 100 (e.g., change sound level, configuration, font, language, etc.), to select a movie or song, to select live multi-media streams, and/or to request services (e.g., drinks, slot attendant, manager, etc.). These selections may occur via any other input device (e.g., a touch screen, voice commands, etc.).

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 with a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more bingo poker options may be presented, one or more mapped gaming options may be presented, and/or the placement of gaming options may be modified based on player preference data. For example, a player may want to have bingo poker gaming options only. Therefore, no non-bingo poker gaming options would be presented.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
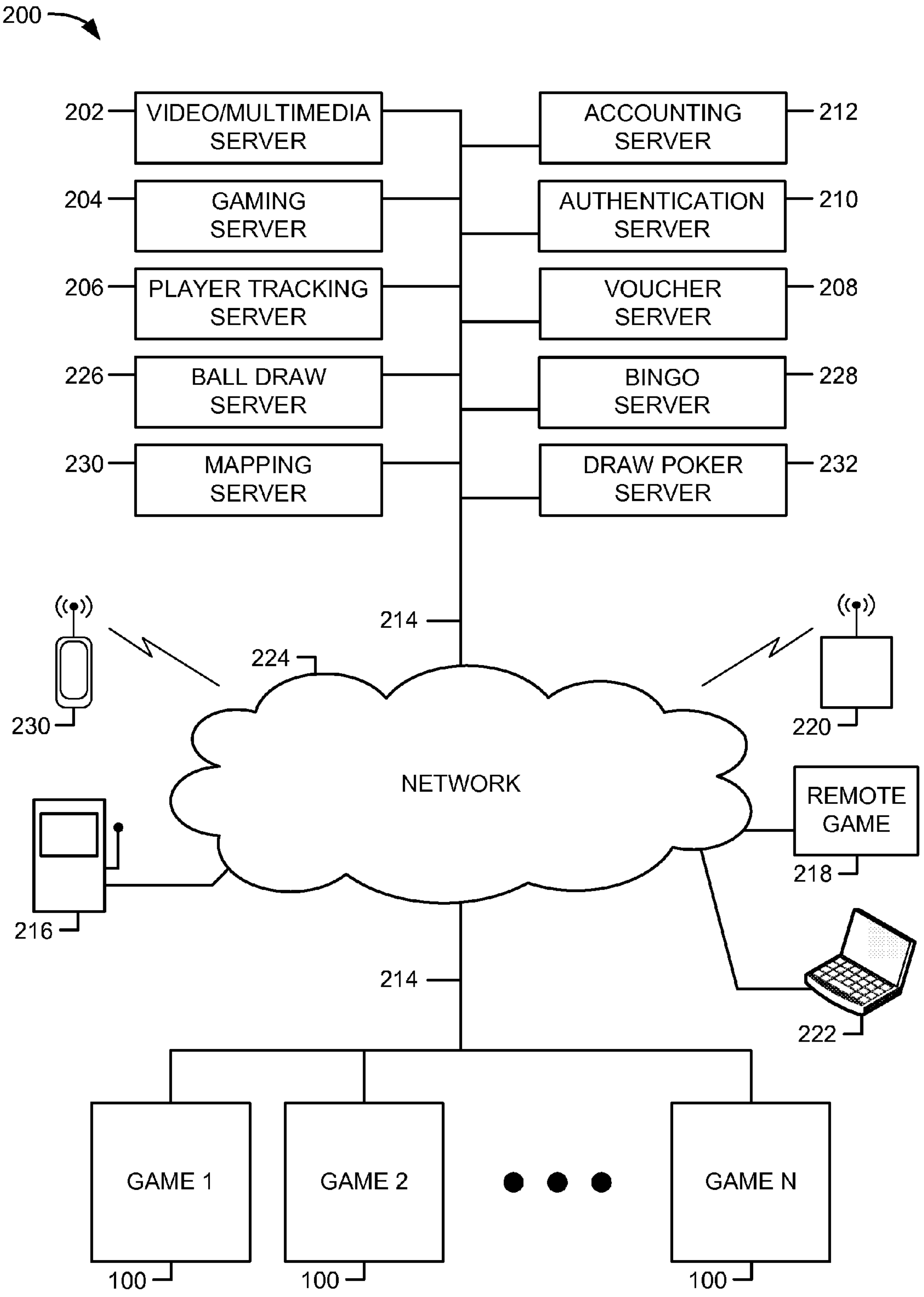
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, an accounting server 212, a ball draw server 226, a bingo server 228, a mapping server 230, and a draw poker module 232.

Electronic gaming system 200 may include video/multimedia server 202, which may be coupled to network 224 via a network link 214. Network 224 may be the Internet, a private network, or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include gaming structure option selections. In addition, the voucher may include data from one or more bingo poker features (e.g., mapped game features).

Mapped game features may be based on various games. These games may include draw poker, poker, Texas hold'em poker, blackjack, baccarat, craps, roulette, any other game, and/or and other form of these games (e.g., Spanish blackjack).

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premise's network, a wide area network, a virtual private network, an enterprise private network, the Internet, and/or any combination thereof. Hardware components such as, network interface cards, repeaters and hubs, bridges, switches, routers, firewalls, and/or any combination thereof may also be part of network 224.

Ball draw server 226 may be a local server, a remote server, a game processor, a processor, and/or any combination thereof. Ball draw server 226 may compile, generate, construct, receive, transmit, and/or store game values (e.g., bingo ball values).

Bingo server 228 may be a local server, a remote server, a game processor, a processor, and/or any combination thereof. Bingo server 228 may compile, generate, construct, receive, transmit, and/or store bingo related data (e.g., bingo cards, number of balls drawn, the order of the balls drawn, etc.).

Mapping server 230 may be a local server, a remote server, a game processor, a processor, and/or any combination thereof. Mapping server 230 may compile, generate, construct, receive, transmit, and/or store index values which relate bingo games to non-bingo games. These index values may be utilized to interrelate non-bingo game play (e.g., game functions for poker, blackjack, etc.) into a bingo game environment.

Draw poker server 232 may be a local server, a remote server, a game processor, a processor, and/or any combination thereof. Draw poker server 232 may compile, generate, construct, receive, transmit, and/or store data relating to one or more poker games.

Blackjack, baccarat, craps, roulette, any other game, and/or and other form of these games (e.g., Spanish blackjack) may utilize a server similar to draw poker server 232.

Figure 3:
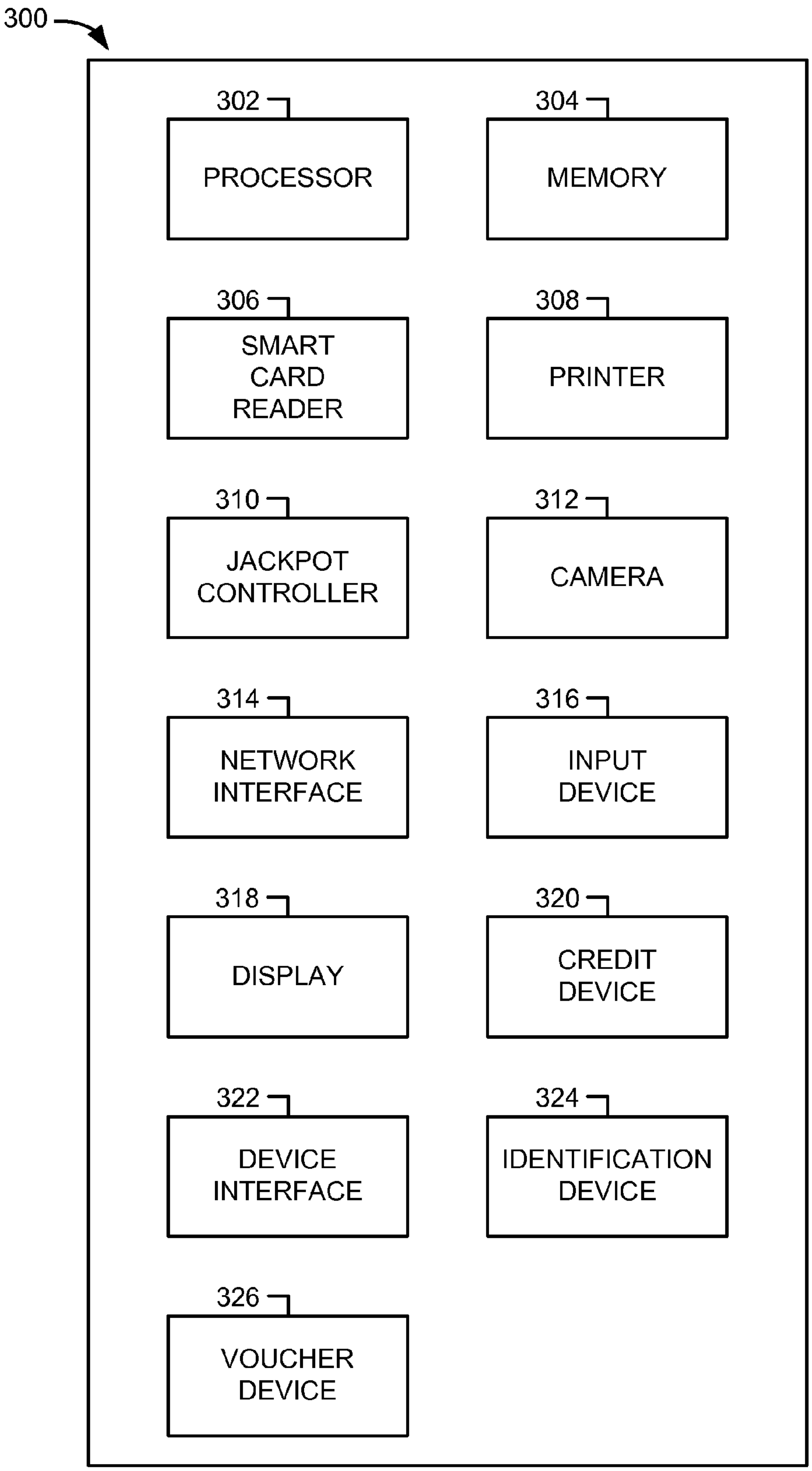
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information relating to symbol combinations, which result in a win (e.g., payout). These payouts may be established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include their image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play (e.g., the player's image as a wild card), or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, accounting server 212, ball draw server 226, bingo server 228, mapping server 230, and/or draw poker module 232.

Input device 316 may be mechanical buttons, electronic buttons, a touch screen, and/or any combination thereof. Input device 316 may be utilized to make a wager, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow for game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with their mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
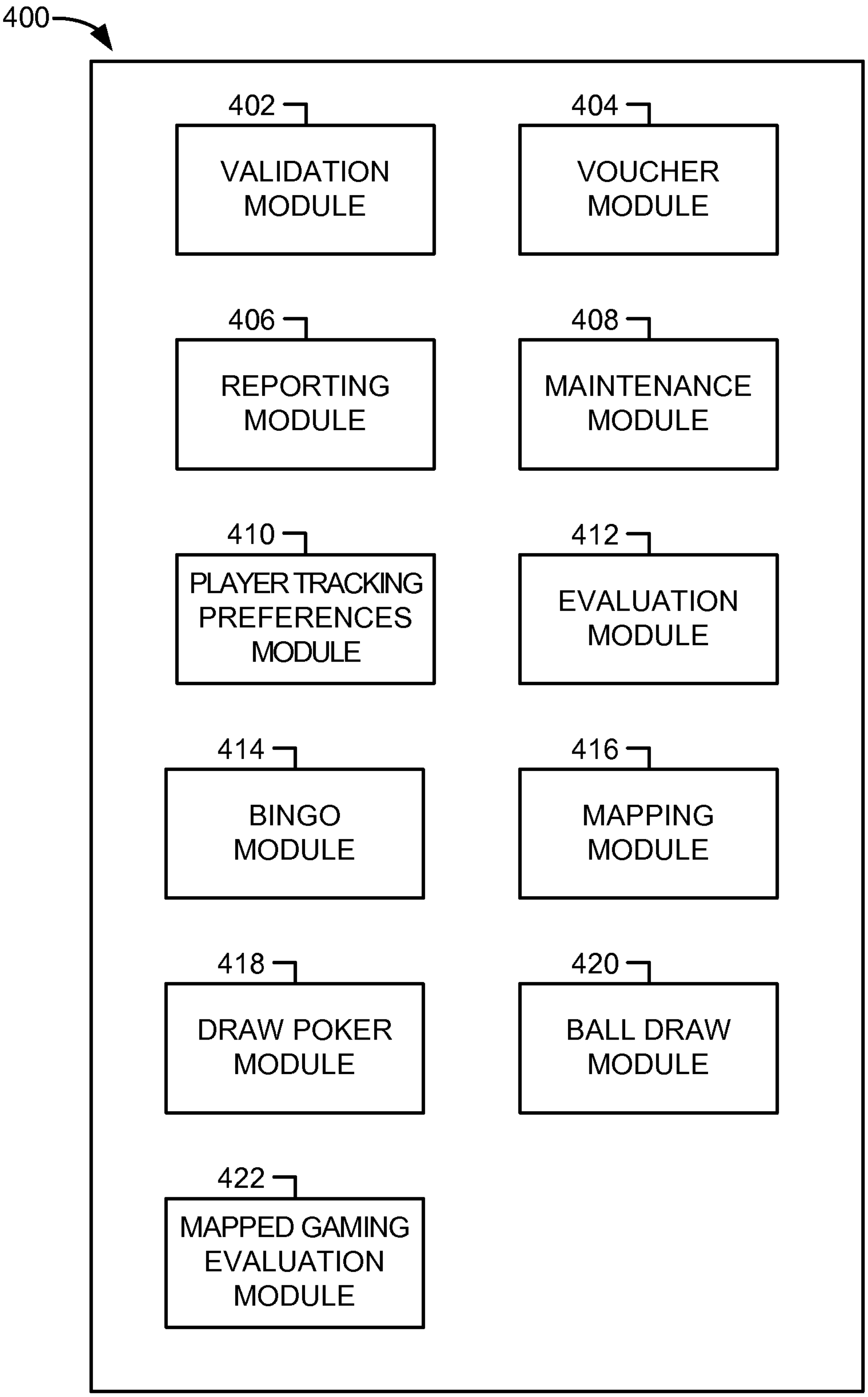
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a bingo module 414, a mapping module 416, a draw poker module 418, and a ball draw module 420.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may determine payouts related to game results when there are no mapping gaming functionality (e.g., bingo poker) utilized.

Bingo module 414 may be a local server, a remote server, a game processor, a processor, and/or any combination thereof. Bingo module 414 may compile, generate, construct, receive, transmit, and/or store bingo related data (e.g., bingo cards, number of balls drawn, the order of the balls drawn, etc.).

Mapping module 416 may be a local server, a remote server, a game processor, a processor, and/or any combination thereof. Mapping module 416 may compile, generate, construct, receive, transmit, and/or store index values which relate bingo games to non-bingo games. These index values may be utilized to interrelate non-bingo game play (e.g., game functions) into a bingo game environment.

Draw poker module 418 may be a local server, a remote server, a game processor, a processor, and/or any combination thereof. Draw poker module 418 may compile, generate, construct, receive, transmit, and/or store data relating to one or more poker games.

Blackjack, baccarat, craps, roulette, any other game, and/or and other form of these games (e.g., Spanish blackjack) may utilize a module similar to draw poker module 418.

Ball draw module 420 may be a local server, a remote server, a game processor, a processor, and/or any combination thereof. Ball draw module 420 may compile, generate, construct, receive, transmit, and/or store game values (e.g., bingo ball values).

Mapped gaming evaluation module 422 may determine payouts related to game results when mapping gaming functionality (e.g., bingo poker) is utilized It should be noted that mapped gaming evaluation module 422 and evaluation module 412 may be combined into one module. Further, there may be one evaluation module where the determined payout does not depend on whether there were any wild symbols, scatter symbols, and/or any other specific symbols. Further, any module, device, and/or logic function in electronic gamine device 100 may be present in electronic gaming system 200. In addition, any module, device, and/or logic function in electronic gaming system 200 may be present in electronic gaming device 100.

Figure 5A:
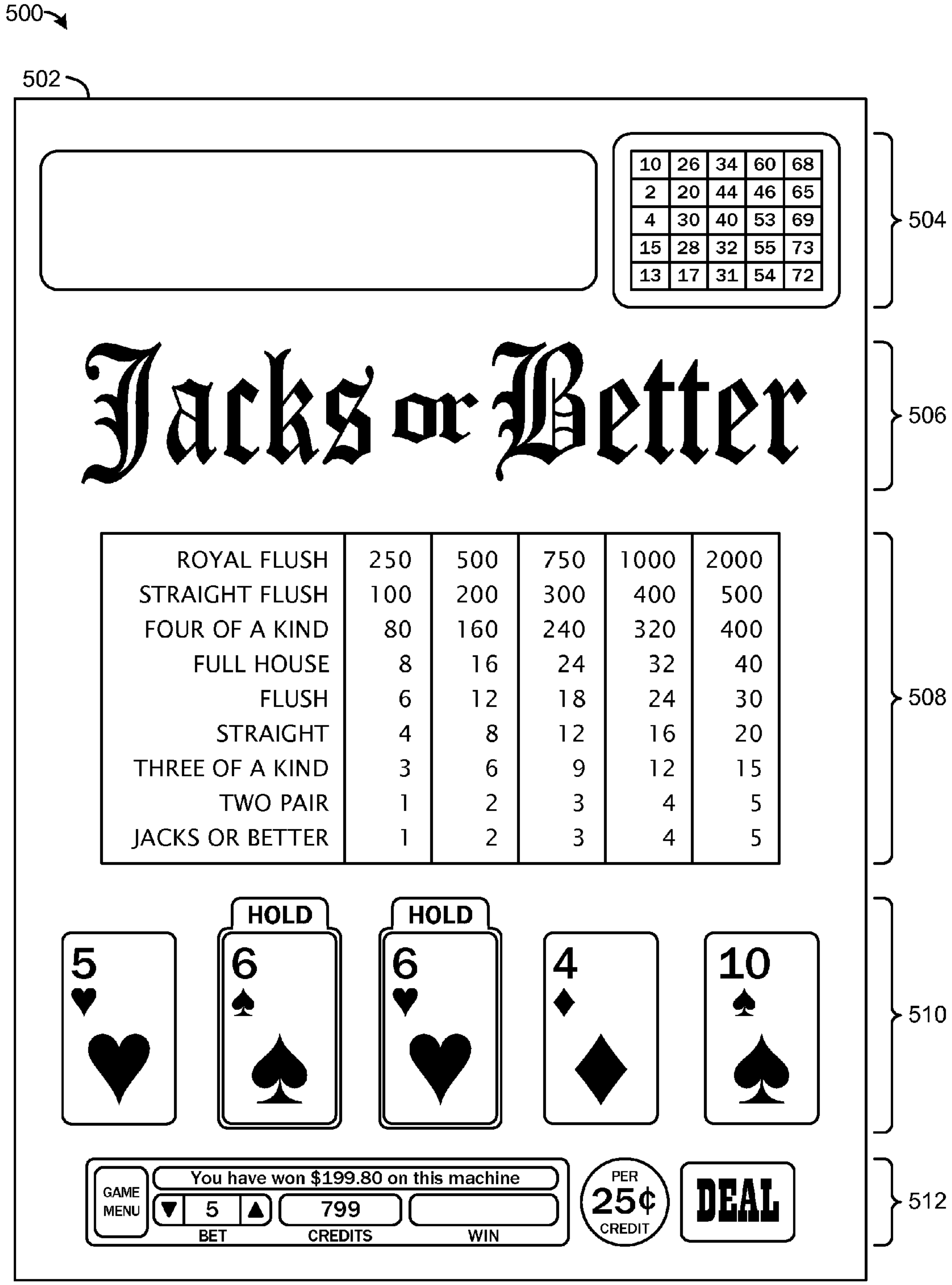
FIG. 5A is an illustration of utilizing a bingo poker option on an electronic gaming device, according to one embodiment.

FIG. 5A is an illustration of utilizing a bingo poker option (e.g., a mapped gaming option) on electronic gaming device 100, according to one embodiment. A gaming image 500 may include a bingo area 504, a game description area 506, a payout table area 508, a symbol area 510, and a gaming data area 512. Bingo area 504 may include a ball drop area 514 and a bingo card area 516 (see FIG. 5B).

Game description area 506 may include information relating to the game. This information may include the game title, game type (e.g., poker, blackjack, etc.), the game maker, and/or any other data relating to the game. For example, the game title for a poker game may be "Jacks or Better".

Payout table area 508 may include data relating to the payouts available for the game. For example, one payout may be 250 credits for a royal flush when 1 credit is bet.

Symbol area 510 may include images, which are utilized to indicate game play. For example, in draw poker five cards (e.g., 5 of hearts, 6 of spades, 6 of hearts, 4 of diamonds, and 10 of spades) may be shown as a dealt hand.

Gaming data area 512 may include additional data relating to the games. For example, a game menu, a bet amount, a winning total, a credit total, a betting increment (e.g., $0.25 per credit), an input button (e.g., deal, draw, etc.), and/or any other gaming data may be shown.

Figures 5B, 5C:
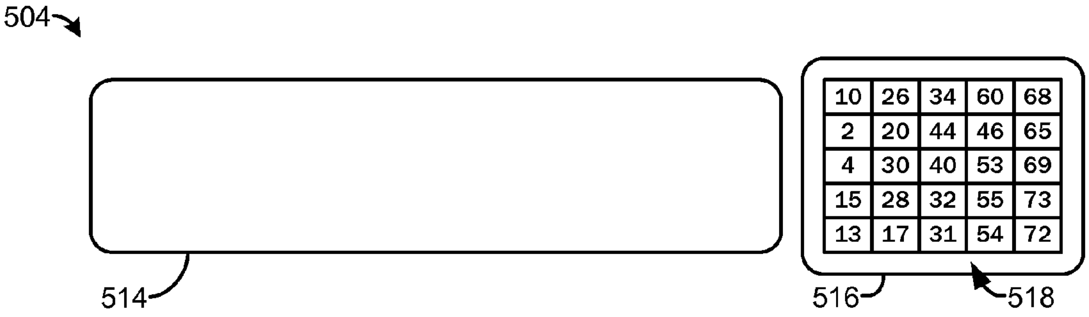
FIG. 5B is another illustration of utilizing a bingo poker option on an electronic gaming device, according to one embodiment.
FIG. 5C is another illustration of utilizing a bingo poker option on an electronic gaming device, according to one embodiment.

In FIG. 5B, another illustration of utilizing a bingo poker option (e.g., a mapped gaming option) on electronic gaming device 100 is shown, according to one embodiment. In this example, bingo area 504 may include ball drop area 514, bingo card area 516, and a bingo card 518. Ball drop area 514 may be the area where the bingo ball values are displayed (see FIGS. 6 and 7). Bingo card area 516 may be where one or more bingo cards 518 utilized by the player are shown.

FIG. 5C is an illustration of utilizing a bingo poker option (e.g., a mapped gaming option) on electronic gaming device 100, according to one embodiment. In this example, payout table area 508 may include a symbol formation 520, a first credit payout 522, a second credit payout 524, a third credit payout 526, a fourth credit payout 528, and a fifth credit payout 530.

Symbol formation 520 may represent the values needed (e.g., symbol combinations) to obtain a winning combination. For example, a royal flush may be a winning combination, which has varying awards of 250 credits (for first credit payout 522), 500 credits (for second credit payout 524), 750 credits (for third credit payout 526), 1000 credits (for fourth credit payout 528), and 2000 credits (for fifth credit payout 530). First credit payout 522 may be based on the player wagering one credit. Second credit payout 524 may be based on the player wagering two credits. Third credit payout 526 may be based on the player wagering three credits. Fourth credit payout 528 may be based on the player wagering four credits. Fifth credit payout 530 may be based on the player wagering five credits. Other examples of winning combinations may be a straight flush, four-of-a-kind, a full house, a flush, a straight, three-of-a-kind, two pair, and jacks or better.

Figure 5D:
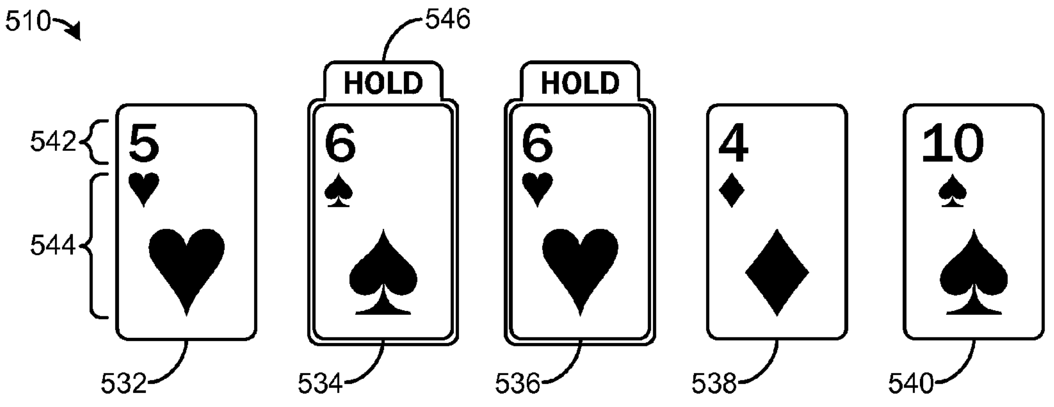
FIG. 5D is another illustration of utilizing a bingo poker option on an electronic gaming device, according to one embodiment.

In FIG. 5D, another illustration of utilizing a bingo poker option (e.g., a mapped gaming option) on electronic gaming device 100 is shown, according to one embodiment. In this example, symbol area 510 may include a first card 532, a second card 534, a third card 536, a fourth card 538, and a fifth card 540. Each of the cards may include a number 542 and a suit 544. A player may select to hold a card which may be indicated by a hold image 546. Any card that is not held by the player may be replaced by redrawing a new card in the redraw round (e.g., bonus round).

Figure 5E:
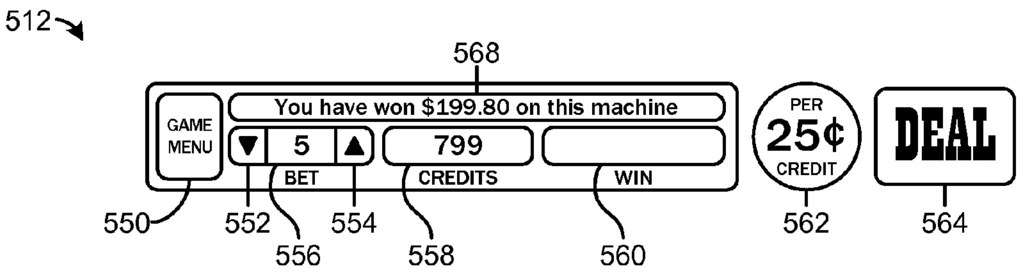
FIG. 5E is another illustration of utilizing a bingo poker option on an electronic gaming device, according to one embodiment.

In FIG. 5E, another illustration of utilizing a bingo poker option (e.g., a mapped gaming option) on electronic gaming device 100 is shown, according to one embodiment. In this example, gaming data area 512 may include a game menu button 550, a bet reducer button 552, a bet amount image 556, a bet increaser button 554, a credit amount image 558, a win amount area 560, a credit value image 562, a deal button 564, and a message area 568.

Game menu button 550 may include data relating to the game. For example, the payout structures, payout odds, the amount won over a predetermined number of game plays, the amount won over a specific time frame, and/or any other game play data may be accessed via game menu button 550. Game menu button 550 may be utilized to change the game from poker to blackjack (or roulette, baccarat, craps, etc.). Game menu button 550 may be utilized to change any other game structure (e.g., credit amounts). For example, the credit amount may be increased/decreased between $0.25 to $1.00 and/or any other values.

Bet reducer button 552 may decrease the amount of credits wagered on game play. Bet amount image 556 may show the amount of credits wagered on game play. Bet increaser button 554 may increase the amount of credits wagered on game play. Credit amount image 558 may show the amount of credits available to the player for game play. Win amount area 560 may show the payout amount of the last winning event (or the last X number of winning events). Credit value image 562 may show the value of a single credit. Deal button 564 may start the dealing of one or more hands. Deal button 564 may also be utilized to start any redrawings of one or more cards. Message area 568 may display any message data to the player. In this case, the message states "You have won $199.80 on this machine".

Figure 6:
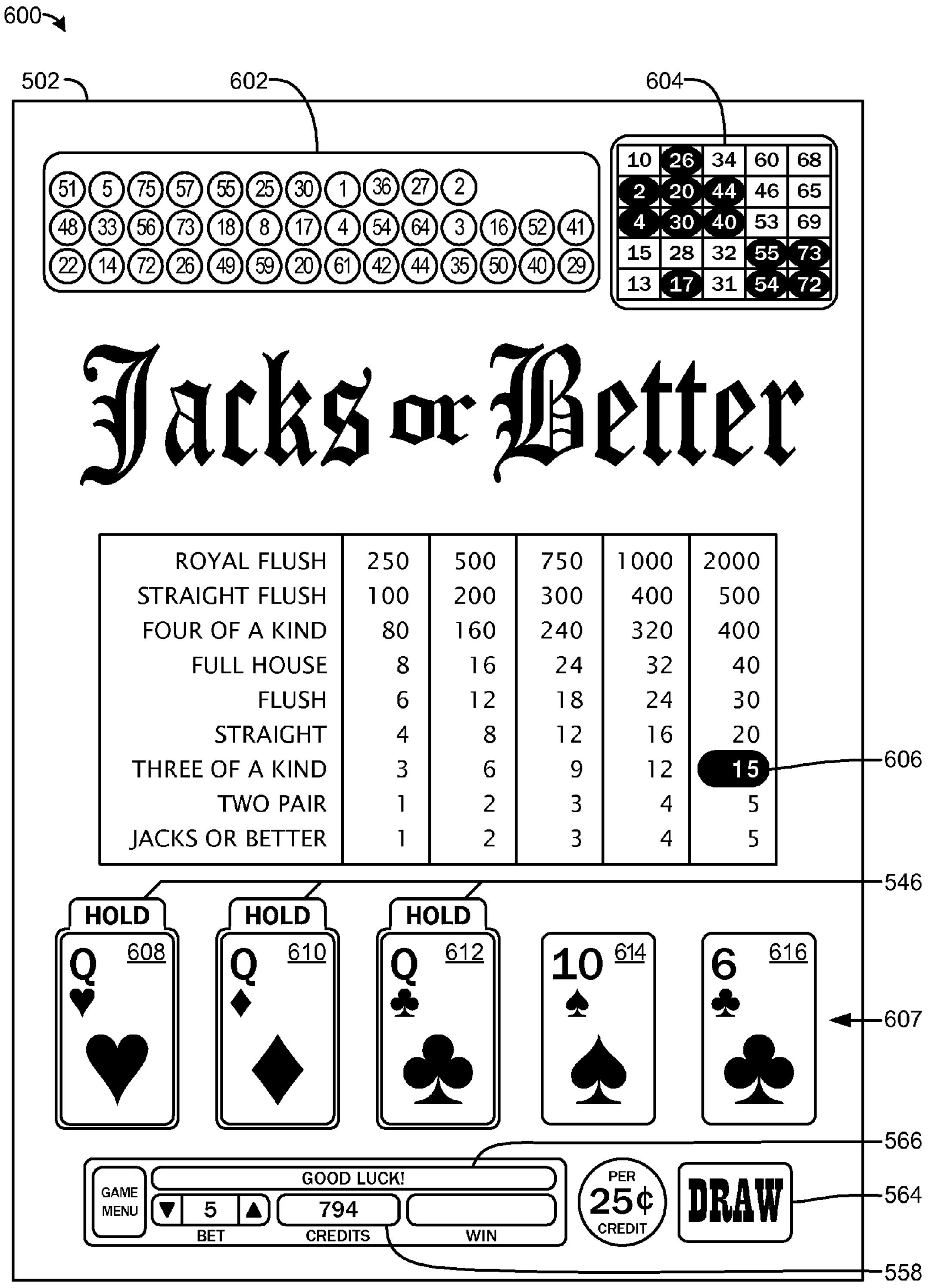
FIG. 6 is an illustration of utilizing a bingo poker option on an electronic gaming device, according to one embodiment.

In FIG. 6, an illustration of utilizing a bingo poker option (e.g., a mapped gaming option) on electronic gaming device 100, according to one embodiment. A gaming image 600 may include a first ball drop 602, a first daubed bingo card 604, an auto-select prize 606, and a first dealt hand 607. In one example, first daubed bingo card 604 may be manually daubed. In another example, first daubed bingo card 604 may be automatically daubed.

First ball drop 602 may represent the game values (e.g., bingo ball values) generated to deal first dealt hand 607. First ball drop 602 may be any number of values (e.g., ball numbers) to be utilized with a bingo card and/or other representative item. For example, some of the values (e.g., bingo ball numbers) obtain in first ball drop 602 may be represented by the numbers 2, 4, 26, 20, 30, 17, 44, 40, 55, 54, 73, and 72. These numbers (e.g., 2, 4, 26, 20, 30, 17, 44, 40, 55, 54, 73, and 72) may be present on the player's bingo card, which once daubed may create first daubed bingo card 604. Other players may utilize the same numbers in first ball drop 602 and/or the other players may utilize different numbers in their first ball drop, which may be specific to their machine.

Auto-select prize 606 may represent the optimal winning combination based on the initial five cards drawn. For example, in this case the best hand is three queens, which has the highest payout amount. This auto-select feature may also be utilized with the final hand.

First dealt hand 607 may be a queen of hearts, a queen of diamonds, a queen of clubs, a ten of spades, and a six of clubs. First dealt hand 607 may be based on first daubed bingo card 604, first ball drop 602, a bingo index, a mapping function, and/or any combination thereof.

The player may elect to hold a first card 608 (e.g., the queen of hearts), a second card 610 (e.g., the queen of diamonds), and a third card 612 (e.g., the queen of clubs). These held cards are represented by a hold image 546. The player may elect to discard a fourth card 614 (e.g., the ten of spades) and a fifth card 616 (e.g., the six of clubs).

The deal button may now be displayed as a draw button 564. Message area 568 may display the message of "GOOD LUCK!".

Figure 7:
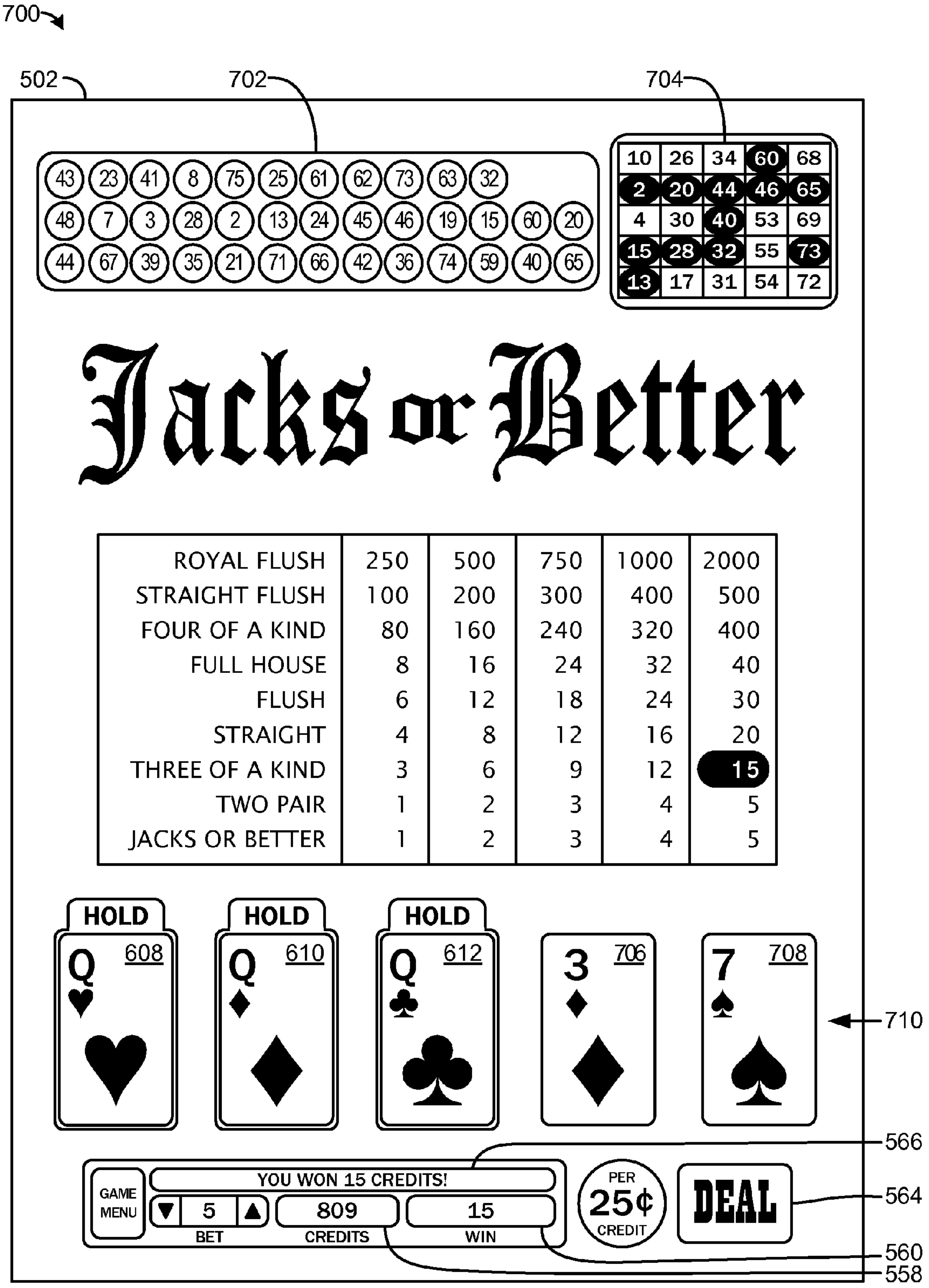
FIG. 7 is an illustration of utilizing a bingo poker option on an electronic gaming device, according to one embodiment.

In FIG. 7, an illustration of utilizing a bingo poker option (e.g., a mapped gaming option) on electronic gaming device 100, according to one embodiment. A gaming image 700 may include a second ball drop 702, a second daubed bingo card 704, and a second dealt hand 710.

Second ball drop 702 may represent the game values (e.g., bingo ball values) generated to deal second dealt hand 710. Second ball drop 702 may be any number of values (e.g., ball numbers) to be utilized with a bingo card and/or other representative item. For example, some of the values (e.g., bingo ball numbers) obtain in first ball drop 702 may be represented by the numbers 2, 15, 13, 20, 28, 44, 40, 32, 60, 46, 65, and 73. These numbers (e.g., 2, 15, 13, 20, 28, 44, 40, 32, 60, 46, 65, and 73) may be present on the player's bingo card, which once daubed may create second daubed bingo card 704. Other players may utilize the same numbers in second ball drop 702 and/or the other players may utilize different numbers in their second ball drop, which may be specific to their machine Second dealt hand 710 may be a queen of hearts, a queen of diamonds, a queen of clubs, a three of diamonds, and a seven of spades. The three queens were obtained from the first ball drop. Second dealt hand 710 may be based on first daubed bingo card 604, second daubed bingo card 704, first ball drop 602, second ball drop 702, first hand dealt 607, the cards elected to be held by the player, a bingo index, a mapping function, and/or any combination thereof.

The deal button may now be displayed as a deal button 564 to activate a new game. Message area 568 may display the message of "YOU WON 15 CREDITS!".

Figure 8:
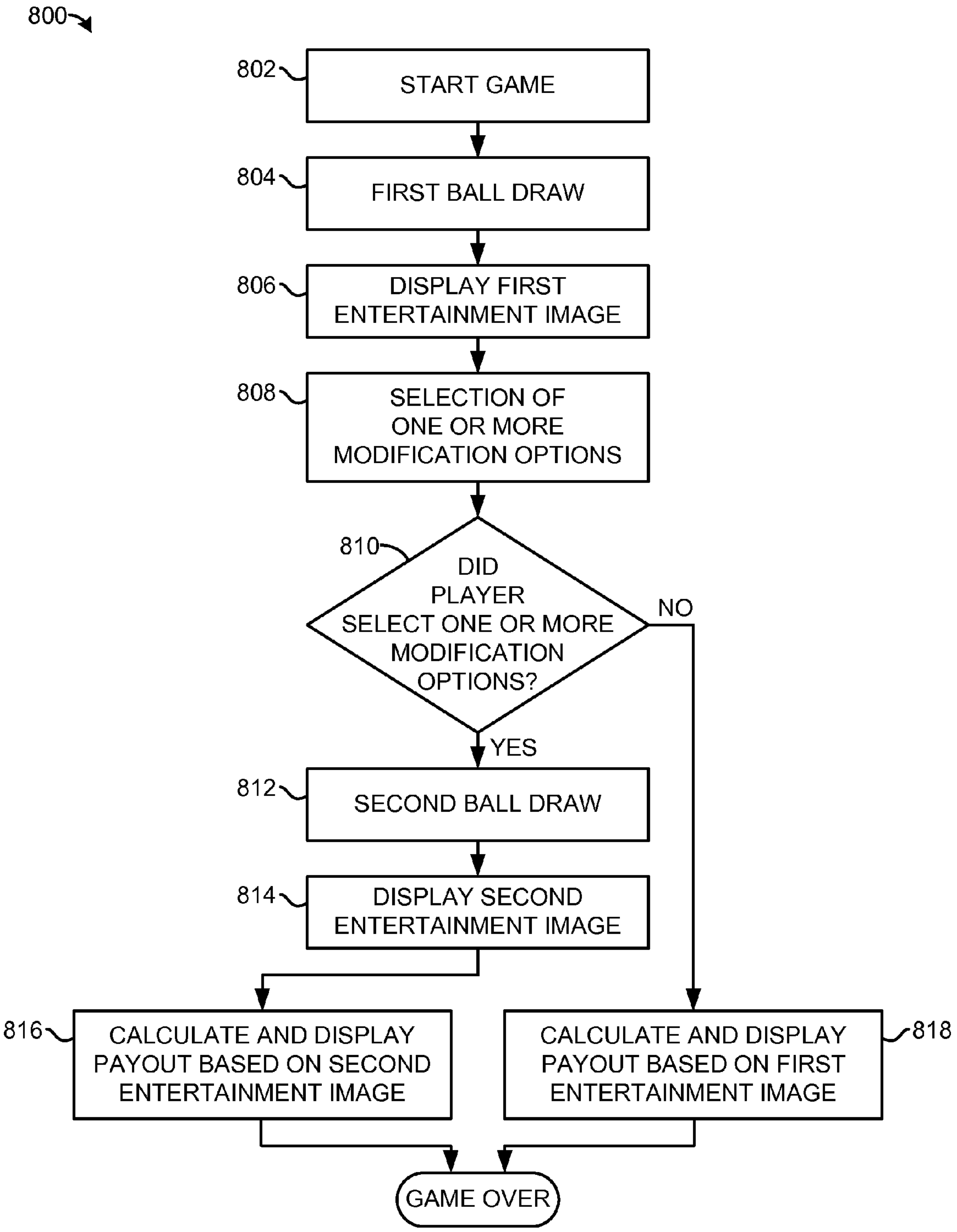
FIG. 8 is an illustration of utilizing a bingo poker option on an electronic gaming device, according to one embodiment.

In FIG. 8, a flow diagram for a bingo poker process 800 is shown. The method may include the player adding credits to electronic gaming device 100 and/or electronic gaming system 200. The method may include the placing of a wager. The method may include the starting of the game (step 802). The method may include a first ball drawing (step 804). The method may include displaying a first entertainment image (step 806). The method may include a selection of one or more modification options (step 808). The method may include electronic gaming device 100 and/or electronic gaming system 200 determining whether the player selected one or more modification options (step 810). If the player did not select one or more modification options, then the method may include calculating and displaying a payout based on the first entertainment image (step 818) and the method may end. If the player did select one or more modification options, then the method may include a second ball draw (step 812). The method may include displaying a second entertainment image (step 814). The method may include calculating and displaying a payout based on the second entertainment image (step 816) and the method may end.

For example, a player may be playing a blackjack style game. In this example, the player may be dealt a hand which totals 11. This total of 11 may have been based on a first ball draw and a first bingo card. The player may elect to hit (e.g., modify their hand) and obtains a card valued at an eight, which brings their hand total to 19. This election to hit may have generated a second ball draw and the card valued of an eight may have been based on this second ball draw, a second bingo card, a bingo index, a mapping function, and/or any combination thereof.

In another example, the method may include the starting of the game. The method may include the player adding credits to electronic gaming device 100. The method may include the player selecting the number of paylines (e.g., one poker hand, two poker hands, etc.) to utilize. The method may include the player making a primary wager on one or more paylines. The method may further include the player making a secondary wager to enable one or more bingo poker gaming option. The method may include receiving input relating to utilizing one or more bingo poker gaming options (e.g., mapped game play). The method may include electronic gaming device 100 pulling one or more ball draws (e.g., an entry from a table). The method may include the evaluation of the game outcome for the primary wager. The method may further include the evaluation of the game outcome for the secondary wager. The method may include presenting the game play to the player. The method may include presenting the game outcome (win or loss) to the player. The method may then end.

Figure 9:
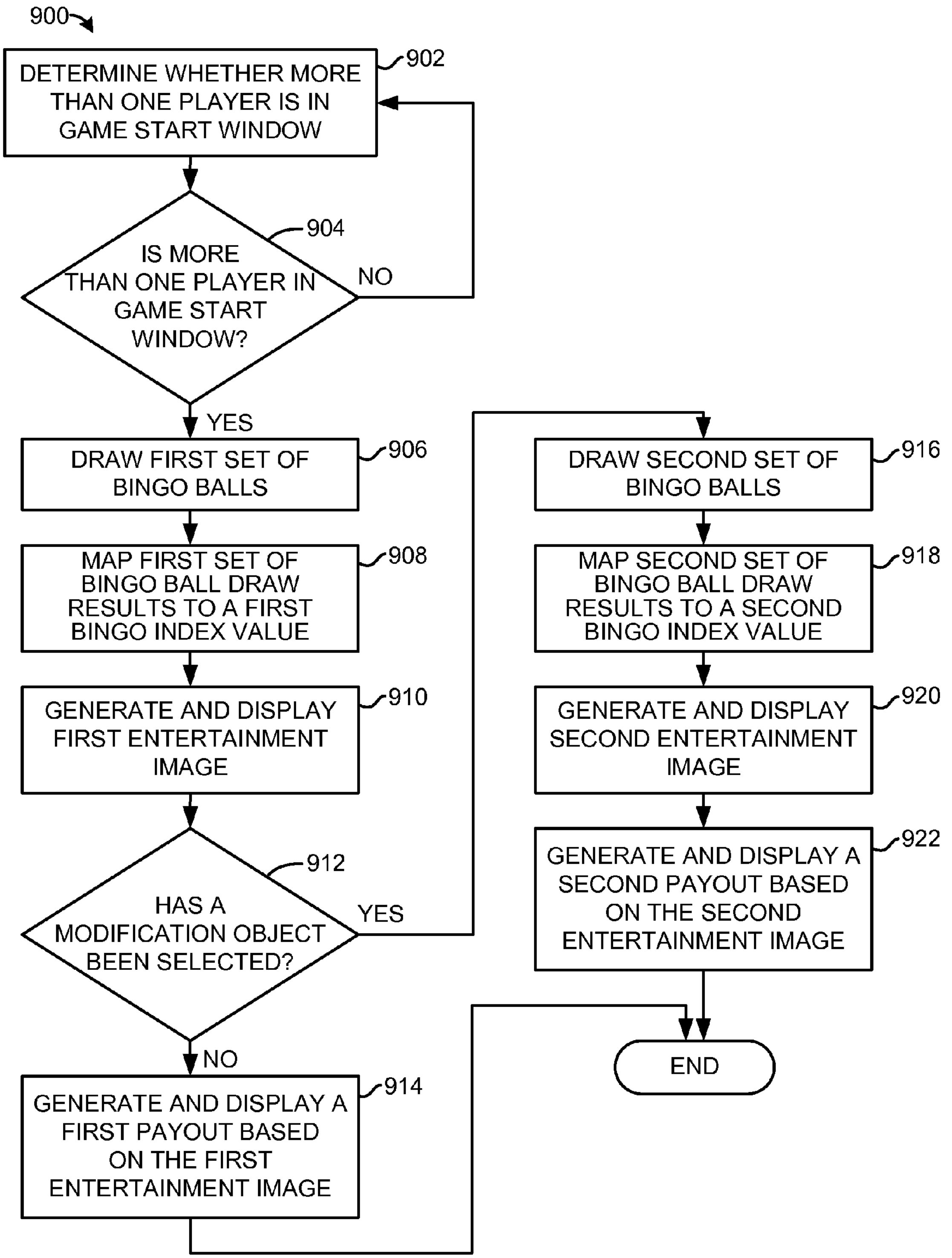
FIG. 9 is another illustration of utilizing a bingo poker option on an electronic gaming device, according to one embodiment.

In FIG. 9, a flow diagram for utilizing a bingo poker functionality 900 is shown, according to one embodiment. The method may include the player adding credits to electronic gaming device 100 and/or electronic gaming system 200. The method may include the placing of a wager. The method may include the starting of the game. The method may include determining whether more than one player (and/or a predetermined number of players are) is in the game start window (step 902). For example, in a Class II gaming environment a predetermined number of player may have to be playing a bingo game for the bingo game to start. In one example, two or more players may have to be playing a poker style game within a window (e.g., a predetermined number of spins, a time period—1 ms, 10 ms, 100 ms, 1 second, 1 minute, etc.) for the game to start and/or a prize pool to be created.

The method may include electronic gaming device 100 and/or electronic gaming system 200 determining whether there is more than one player (and/or a predetermined number of players) in the game start window (step 904). If there is not more than one player (and/or a predetermined number of players) in the game start window, then the method moves back to step 902. If there is more than one player (and/or a predetermined number of players) in the game start window, then the method may include drawing a first set of bingo balls (step 906). The method may include mapping a first set of bingo ball draw results to a first bingo index value (step 908). The method may include generating and displaying a first entertainment image (step 910). The method may include electronic gaming device 100 and/or electronic gaming system 200 determining whether a modification object has been selected (step 912). If no modification object has been selected, then the method may include generating and displaying a first payout based on the first entertainment image (step 914) and the method may end. If one or more modification objects have been selected, then the method may include drawing a second set of bingo balls (step 916). The method may include mapping the second set of bingo ball draw results to a second bingo index value (step 918). The method may include generating and displaying a second entertainment image (step 920). The method may include generating and displaying a second payout based on the second entertainment image (step 922) and the method may end.

For example, if a player has been dealt a royal flush, which may be the best possible hand with the best possible payout, then the player may elect that no objects (e.g., cards) be modified. In another example, if a player has been dealt four of the five cards needed to obtain a royal flush, the one card that does not complete the royal flush may be discarded and a new card selected (e.g., based on a second set of bingo ball and/or an index) to replace the discarded card to potentially complete the royal flush.

Figure 10:
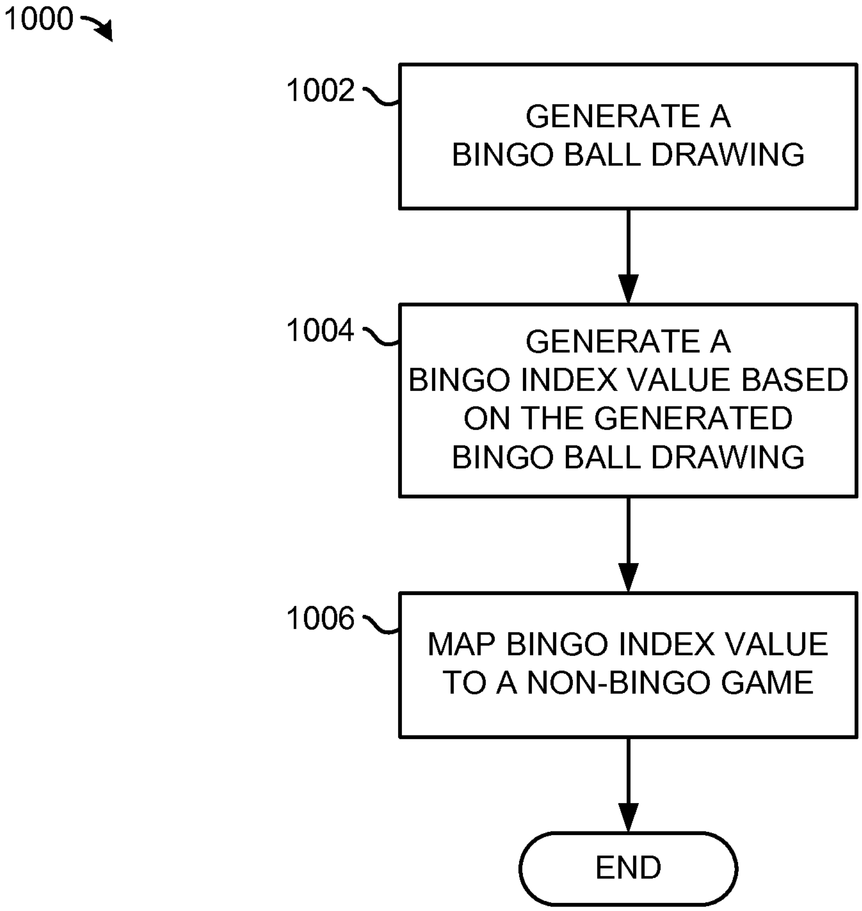
FIG. 10 is another illustration of utilizing a bingo poker option on an electronic gaming device, according to one embodiment.

In FIG. 10, a flow diagram for utilizing one or more mapping gaming options 1000 is shown, according to one embodiment. The method may include generating a bingo ball drawing (step 1002). The method may include generating a bingo index value based on the generated bingo ball drawing (step 1004). The method may include mapping a bingo index value to a non-bingo game (step 1006). The method may end.

These non-bingo games may include draw poker, poker, Texas hold'em poker, blackjack, baccarat, craps, roulette, any other game, and/or and other form of these games (e.g., Spanish blackjack).

Figure 11:
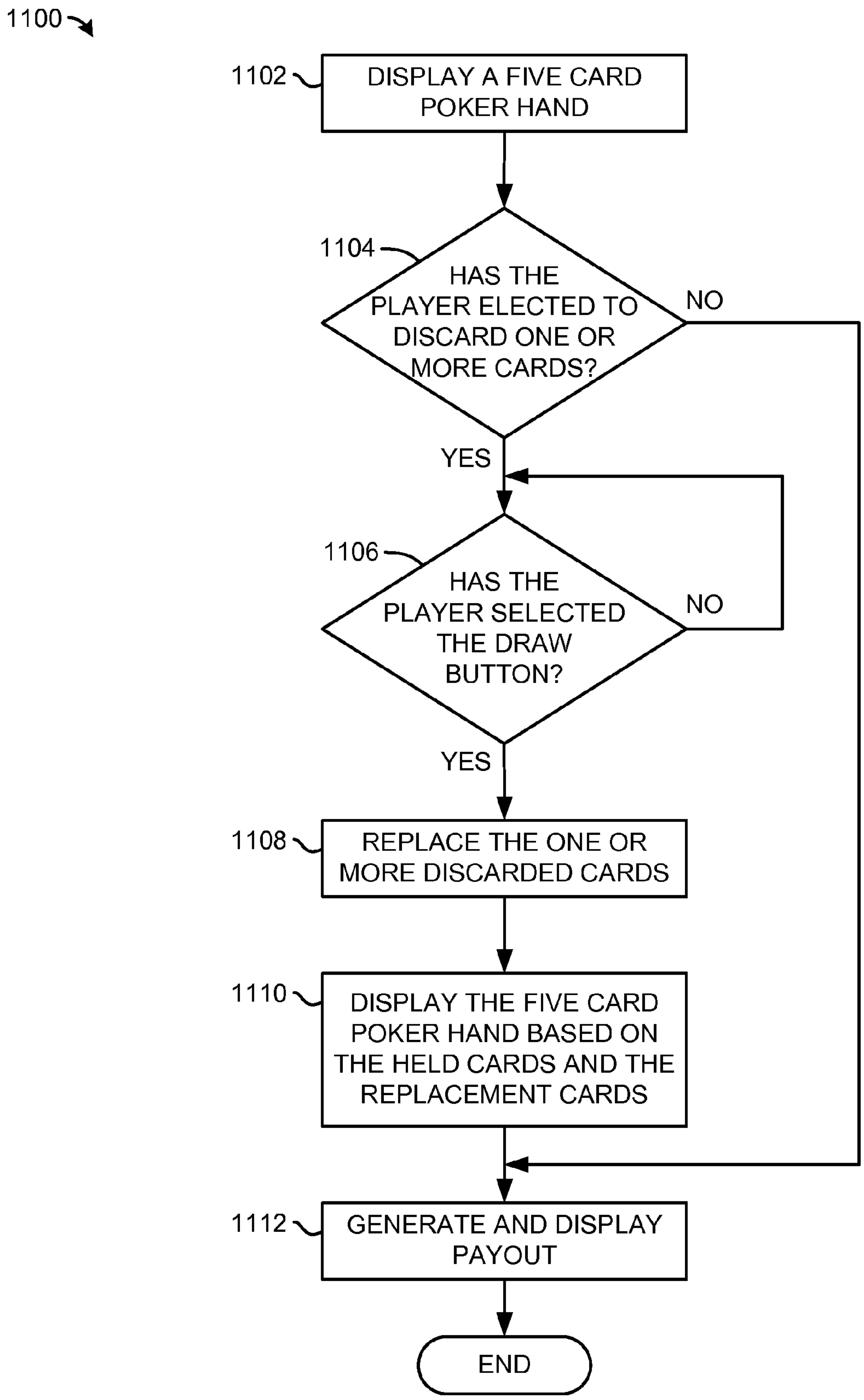
FIG. 11 is another illustration of utilizing a bingo poker option on an electronic gaming device, according to one embodiment.

In FIG. 11, a flow diagram for utilizing one or more bingo poker options 1100 is shown, according to one embodiment. The method may include displaying a poker hand (step 1102). The method may include electronic gaming device 100 and/or electronic gaming system 200 determining whether the player has elected to discard one or more cards (step 1104). If the player has not elected to discard one or more cards, then the method may generate and display the payout (step 1112) and the method may end. If the player has elected to discard one or more cards, then the method may include electronic gaming device 100 and/or electronic gaming system 200 determining whether the player has selected the draw button (step 1106). If the player has not selected the draw button, then the method may move back to step (1106). If the player has selected the draw button, then the method may replace the one or more discarded cards (step 1108). The method may include displaying the poker hand based on the held cards and the replacement cards (step 1110). The method may include generating and displaying a payout (step 1112) and the method may end. For example, if a player has been dealt a royal flush, which may be the best possible hand with the best possible payout, then the player may elect that no objects (e.g., cards) be modified. In another example, if a player has been dealt three of the five cards needed to obtain a royal flush, then the two cards that do not complete the royal flush may be discarded and two new cards selected (e.g., based on a second set of bingo ball and/or an index) to replace the discarded cards to potentially complete the royal flush.

Figure 12:
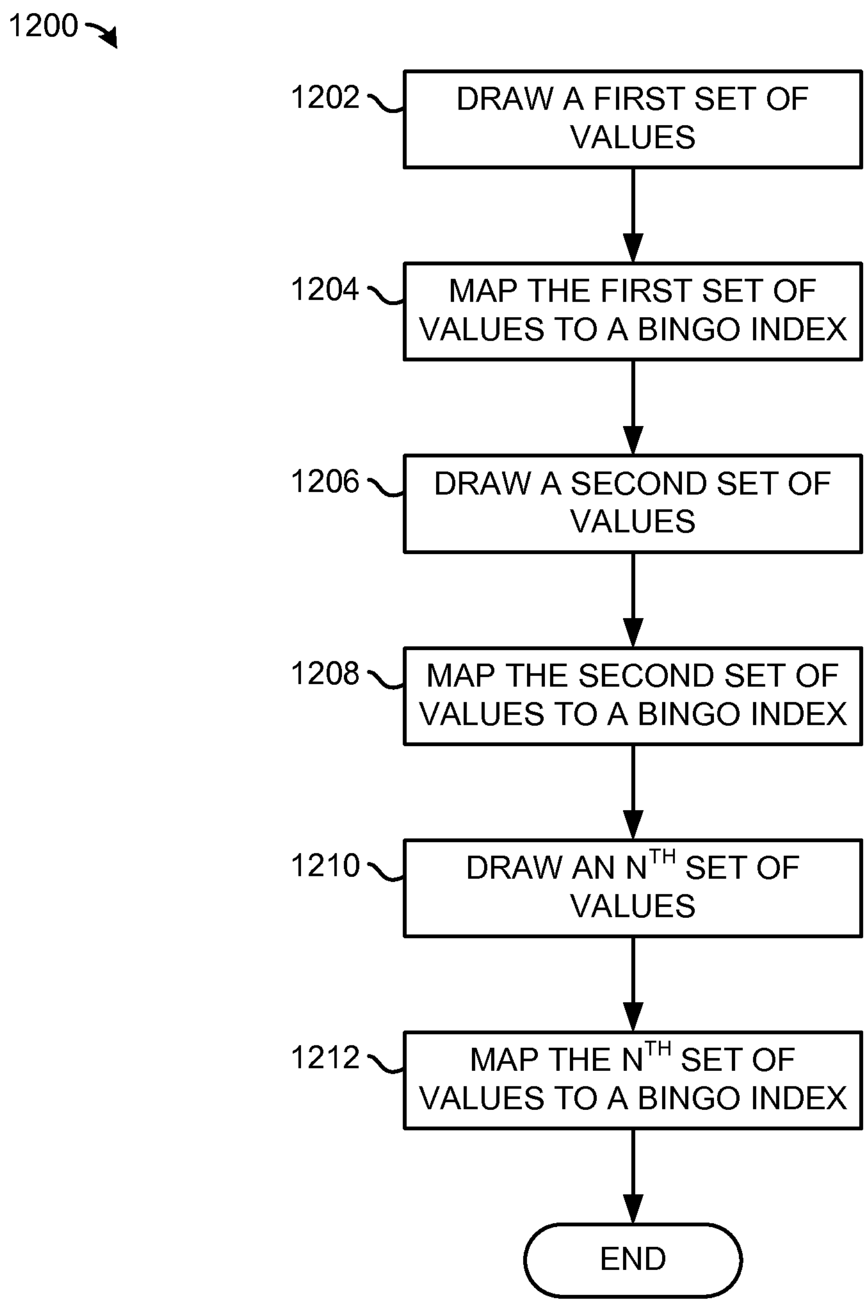
FIG. 12 is an illustration of utilizing a game mapping functionality on an electronic gaming device, according to one embodiment.

FIG. 12 is a flow diagram for utilizing a game mapping functionality on an electronic gaming device, according to one embodiment. The method may include drawing a first set of values (step 1202). The values may be bingo ball values and/or any other values related to a game. The method may include mapping the first set of values to an index (step 1204). The index may be a bingo index, a bingo card index, a bingo ball index, and/or any other value related to a game index. The method may include drawing a second set of values (step 1206). The method may include mapping the second set of values to an index (step 1208). The method may include drawing an $n^{th}$ set of values (step 1210). The method may include mapping the $n^{th}$ set of values to an index (step 1212).

For example, in draw poker there may only be two sets of values (e.g., a first set of values—dealt hand and a second set of values—redraw/final hand). However, in blackjack there may be more than two sets of values. For example, the first set of values may give the player a hand that has a total value of 5 (e.g., a two of spades and a three of hearts). The second set of values may give the player an additional value of 4 (e.g., a four of clubs), which means the total value of the player's hand is now 9. The third set of values may give the player an additional value of 2 (e.g., a two of diamonds), which means the total value of the player's hand is now 11. The fourth set of values may give the player an additional value of 10 (e.g., a ten of hearts), which means the total value of the player's hand is now 21. In this example, there were four sets of values drawn. These sets of values may have been mapped to one, two, three, and/or four index values. These sets of values may be mapped to any number of index values (e.g., 0 to $n^{th}$).

Figure 13:
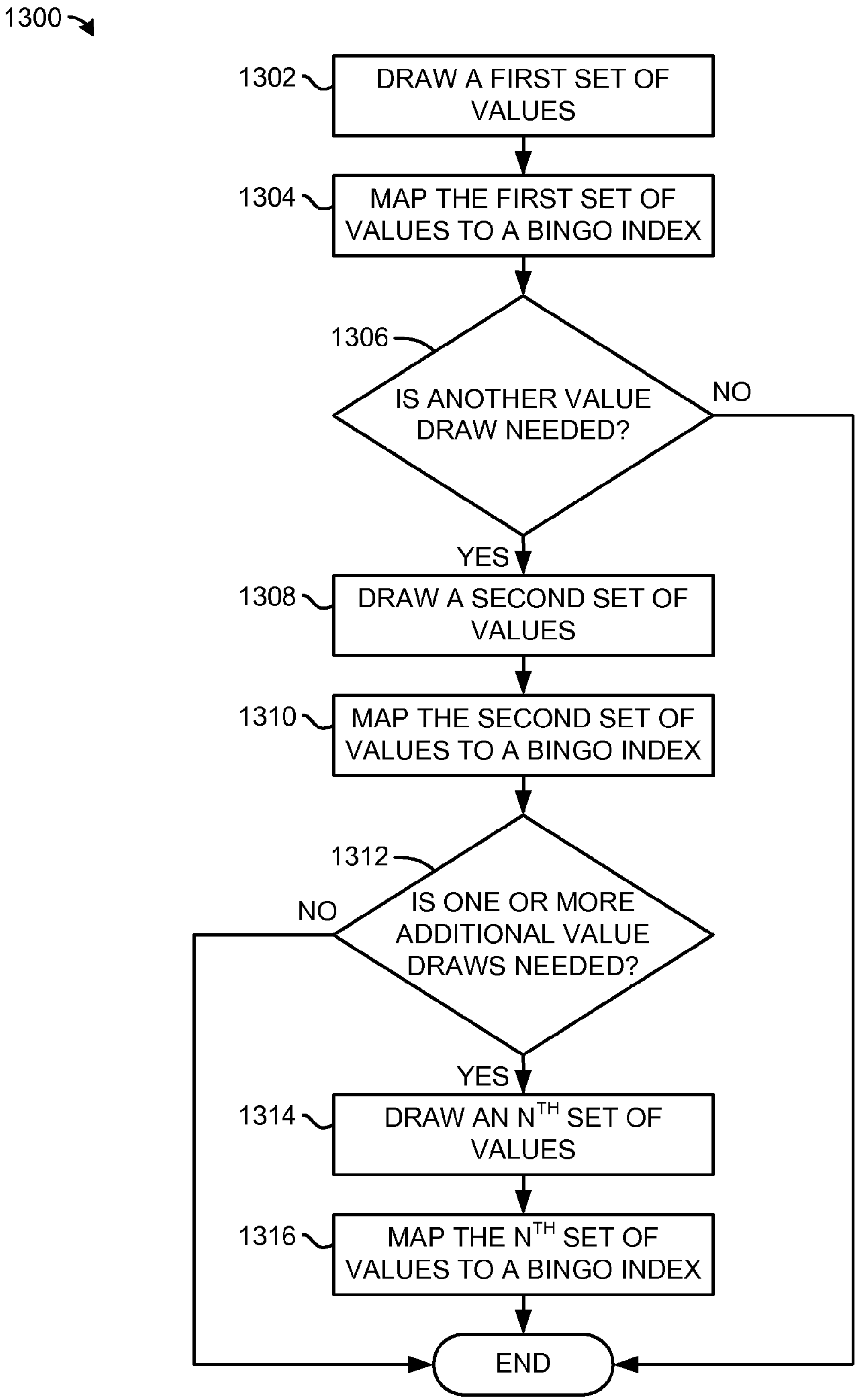
FIG. 13 is another illustration of utilizing a game mapping functionality on an electronic gaming device, according to one embodiment.

FIG. 13 is another flow diagram for utilizing a game mapping functionality on an electronic gaming device, according to one embodiment. The method may include drawing a first set of values (step 1302). The values may be bingo ball values and/or any other values related to a game. The method may include mapping the first set of values to an index (step 1304). The index may be a bingo index, a bingo card index, a bingo ball index, and/or any other value related to a game index. The method may include electronic gaming device 100 and/or electronic gaming system 200 determining whether another value draw is needed (step 1306). If no additional value draws are needed, then the method may end (step 1318). If additional value draws are needed, then the method may include drawing a second set of values (step 1308). The method may include mapping the second set of values to an index (step 1310). The method may include electronic gaming device 100 and/or electronic gaming system 200 determining whether one or more additional value draws are needed (step 1312). If no additional value draws are needed, then the method may end (step 1318). If one or more additional value draws are needed, then the method may include drawing up to an $n^{th}$ set of values (step 1314). The method may include mapping up to the $n^{th}$ set of values to an index (step 1316).

The index may be one or more indexes, index values, mapped indexes, mapped game play, etc.

For example, in blackjack a dealer must hit until the dealer's hand has a value of over 16. In one example, the first set of values may give the dealer a hand that has a total value of 5 (e.g., a two of spades and a three of hearts). The second set of values may give the dealer an additional value of 4 (e.g., a four of clubs), which means the total value of the dealer's hand is now 9. The third set of values may give the dealer an additional value of 2 (e.g., a two of diamonds), which means the total value of the dealer's hand is now 11. The fourth set of values may give the dealer an additional value of 3 (e.g., a three of hearts), which means the total value of the dealer's hand is now 14. The fifth set of values may give the dealer an additional value of 2 (e.g., a two of hearts), which means the total value of the dealer's hand is now 16. The sixth set of values may give the dealer an additional value of 1 (e.g., an ace of spades), which means the total value of the dealer's hand is now 17. In this example, the dealer had to continue to hit until the dealer's hand had a value of at least 17. In this example, there were six sets of values drawn, which may have been mapped to any number of index values (e.g., 0 to $n^{th}$).

In an exemplary embodiment, a poker game may start when a deal button is pressed. A server (e.g., local server and/or remote server) may generate a first ball drawing (e.g., bingo ball values), which may include 1 of 5,200,300 possible bingo patterns. From a first predetermined or random number (e.g., 1, 5, 8, 12, etc.) of matches (e.g., this is when a drawn bingo ball value equals a value on a player's bingo card) the player's bingo card may be autodaubed and the resulting pattern may be shown as a first pattern. (see FIG. 6 reference numbers 602 and 604). In one example, the first predetermined or random number is 12.

A first entertaining image (e.g., poker hand, blackjack cards, roulette wheel spin, baccarat cards, etc.) may be utilized which is based on the first pattern. In one example, the system and/or method may select 5 of 52 standard playing cards as a function of the first pattern. (see FIG. 6, reference number 607). These 5 cards may be shown to the player via a display screen as a dealt hand. In addition, the system and/or method may auto-select the best possible present payout. For example, the system and/or method may auto-select the best 1 of 32 possible claim-bonus numbers for the player and shown this number to the player. (see FIG. 6, reference number 606).

In one example, the player selected bonus may allow the player to modify the claim-bonus to any 1 of the 32 possible values. The system and/or method may wait for the player to press the draw button to signify the player's final selection and/or approval of the claim-bonus number. In another example, the player may make a selection that indicates that the player does not want to draw any new cards and wants to keep all 5 cards initially dealt to the player. In this example, the system and/or method may calculate a final payout prize amount as a function of the first pattern and show this amount to the player as a winning amount.

In another example, the player may make a selection that indicates that the player wants to replace one or more cards with new cards via a redraw request. In this example, a server (e.g., local server and/or remote server) may generate a second ball drawing (e.g., bingo ball values), which may include 1 of 5,200,300 possible bingo patterns. From a second predetermined or random number (e.g., 1, 5, 8, 12, etc.) of matches (e.g., this is when a drawn bingo ball value equals a value on a player's bingo card) the player's bingo card may be autodaubed and the resulting pattern may be shown as a second pattern. (see FIG. 7 reference numbers 702 and 704). In one example, the second predetermined or random number is 12.

A second entertaining image (e.g., poker hand, blackjack cards, roulette wheel spin, baccarat cards, etc.) may be utilized which may be based on the first pattern and the second pattern. In one example, the system and/or method may select 5 of 52 standard playing cards as a function of the first pattern and the second pattern. (see FIG. 7, reference number 710). These 5 cards may be shown to the player via a display screen as a drawn hand (e.g., final hand). In this example, the system and/or method may calculate a final payout prize amount as a function of the first pattern and the second pattern and show this amount to the player as a winning amount. The calculated bonus payout may be determined as a final bonus payout prize amount as a function of the first pattern, bonus-claim, and/or the second pattern.

The system and/or method may provide a mapped game (e.g., poker, etc.) in a Class II environment that has similar features as a game (e.g., poker, etc.) in a Class III environment. In one scenario, a predetermined number of players are actively engaged in a Class II bingo-based draw poker where each player's machine is connected to a ball draw server for the first standard ball draw. In the standard ball draw phase, a game ending pattern may occur when the first ball draw shall be a cover-all. The ball draw may continue until all 75 balls have been drawn and recorded in order. The first player to claim their cover-all is awarded a payout (e.g., $0.01) and the standard phase may end.

In a first interim phase with a draw poker entertaining image, the system and/or method may construct/generate a bingo index value from the standard ball draw results. The bingo index value may be utilized to select 1 of 2,598,960 possible poker hands. The selected poker hand may be displayed to a player.

In a second interim phase with a draw poker entertaining image, the system and/or method may allow the player to select 0 to 5 cards to hold. The system and/or method may wait for the player to select the draw button. The system and/or method may request that the player select the draw button. The system and/or method may generate a second bingo ball draw. The system and/or method may construct/generate a second bingo index value. The system and/or method may select 1 of N possible poker hands based on the second bingo index value and the cards drawn. The selected poker hand is displayed and the win value (if any) for the second bingo game may be based on a predetermined payout for the final poker hand selected.

In various poker examples, when 5 cards are held and 0 cards are drawn, then there is 1 possible final poker hand. When 4 cards are held and 1 card is drawn, then there are 47 possible final poker hands. When 3 cards are held and 2 cards are drawn, then there are 1,081 possible final poker hands. When 2 cards are held and 3 cards are drawn, then there are 16,215 possible final poker hands. When 1 card is held and 4 cards are drawn, then there are 178,365 possible final poker hands. When 0 cards are held and 5 cards are drawn, then there are 1,533,939 possible final poker hands.

It should be noted that other games (e.g., blackjack, baccarat, etc.) may be mapped to a Class II bingo-based game in a similar manner.

In an exemplary embodiment, the system and/or method may have all possible outcomes (e.g., 5-card poker hands) generated and stored at system startup. In another example, the system and/or method may dynamically generate all possible outcomes (e.g., 5-card poker hands) during game play.

In another example, the poker tables for the second interim phase may be dynamically constructed after the player presses the draw button. In another example, the poker tables for the second interim phase may be static and constructed and stored before the player presses the draw button.

In another example, the 5 cards displayed and the cards held may be used to select the entire set of final poker hands the player may arrive upon after the second bingo ball draw.

Utilizing the first interim phase and the second interim phase, the range of distinct ball draw pairs may be approximately 27 trillion possible outcomes.

In one example, the system and/or method may optimize the payout for the player. In another example, the system and/or method may allow the player to select a non-optimal payout potential outcome. For example, the player may be dealt four-of-a-kind, but the player wants to go for a royal flush. In this case, the system and/or method may allow the player to go for the royal flush.

The player may select the optimal value (e.g., highest payout) by pressing only the deal/draw button. The player may select any card to hold and/or discard by inputting data. The player may input this data by touching the screen, selecting one or more buttons, and/or any other input option.

In should be noted that any amount of bingo ball values (e.g., 1 to N) may be utilized. In one example, 25 bingo balls may be utilized. In another example, 100 bingo balls may be utilized. In another example, 1,000,000 bingo balls may be utilized. In one example, the order of the bingo balls may be recorded.

In one example, the bingo ball drop may produce a 12 spot pattern based on the first 12 hits (e.g., matches) on the bingo card. The 12 spot pattern may be modified to any pattern (e.g., 10, 20, 30, 100, etc.). The bingo ball drops may be generated by a local processor, a local server, a remote server, and/or any combination thereof.

In an exemplary roulette embodiment, the electronic gaming device may include a plurality of reels. The plurality of reels may include a plurality of symbols (e.g., red, black, number (e.g., 0, 00, 1, 2, nth), number groups (e.g., 1-13, 14-26, 27-36, etc.), odd numbers, even numbers, etc.). The electronic gaming device may include a first payline, a second payline, and a memory. The memory may include a payline module. The payline module may include a plurality of payline structures. The electronic gaming device may include a processor. The processor may receive primary wagers on one or more paylines, mapped gaming options, etc. The processor may receive one or more secondary wagers on one or more mapped gaming options, paylines, etc.

In another embodiment, the processor may determine a payout based on the primary wagers. The electronic gaming device may include a network interface, which may receive data from at least one of a server and one or more gaming devices. The electronic gaming device may include a display, which may display one or more selected paylines.

In another example, the display may shade one or more non-selected paylines and/or non-selected mapped gaming options. The electronic gaming device may include a player preference input device. The player preference input device may modify a game configuration based on data from an identification device. The processor may multiply a prize value based on one or more multiplier banking options.

In an exemplary embodiment, electronic gaming device 100 and/or electronic gaming system 200 may include a plurality of reels. The plurality of reels may form a 5-by-5 matrix, a 3-by-5 matrix, a 4-by-5 matrix, a 4-by-3 matrix, a 5-by-3 matrix, or any number-by-any number matrix.

In one embodiment, the electronic gaming device may include a plurality of reels. The plurality of reels may include a plurality of symbols. The electronic gaming device may include one or more paylines formed on at least a portion of the plurality of reels. The electronic gaming device may include a memory. The memory may include a bingo gaming module. The bingo gaming module may include a plurality of bingo gaming structures. The electronic gaming device may include a processor, which may select a bingo gaming structure (e.g., blackjack, poker, baccarat, etc.) based on a received input.

In another example, the one or more symbols may include a credit amount symbol, a multiplier symbol, a free spin symbol, and/or a blank symbol.

In one embodiment, the electronic gaming device may include a display and a memory. The memory may include a first mapped bingo value index. The electronic gaming device may further include a processor, which may draw a first set of bingo ball values. The processor may display via the display a first image based on one or more of the first set of bingo ball values and the first mapped bingo value index.

In another example, the processor may determine a first payout based on the first image and a signal where the signal indicates that there is no redraw. In another example, the processor may draw a second set of bingo ball values based on a redraw signal. In another example, the processor may display a second image based on one or more of the second set of bingo ball values and the first mapped bingo value index. In another example, the processor may determine a second payout based on the second image. In another example, the processor may display a second image based on one or more of the second set of bingo ball values and a second mapped bingo value index.

In another example, the first mapped bingo value index and the second mapped bingo value index may be different. In another example, one or more images may relate to a non-bingo game. The non-bingo game may be at least one of poker, blackjack, roulette, and baccarat.

In another embodiment, a method of providing gaming options may include drawing a first set of bingo ball values based on a game window determination. The method may include mapping the first set of bingo ball values to a first bingo index value. The method may also include generating a first image based on the first bingo index value. The method may include displaying the first image.

In another example, the method may include drawing a second set of bingo ball values based on a redraw signal. In another example, the method may include mapping the second set of bingo ball values to a second bingo index value. The method may include generating and displaying a second image based on the second bingo index value.

In another embodiment, a method of providing gaming options may include generating a bingo value index. The method may include mapping the bingo value index to game play data. The method may include storing one or more of the bingo value index, a mapped bingo value index, and a mapped game play data.

In another example, the game play data is a non-bingo game play data. The non-bingo game play data may relate to at least one of a poker game, a blackjack game, a roulette game, and a baccarat game. In another example, the method may include generating one or more images based on one or more of the bingo value index, the mapped bingo value index, and the mapped game play data. In another example, the method may include storing the one or more images.

In another example, the method may include generating a second bingo value index. In another example, the second bingo value index may be utilized for at least a partial retriggering event.

Gaming system and/or gaming device may be a Class II system. Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a display;

a memory; and a processor configured to receive a first set of bingo ball values from an external server, the processor configured to display via the display a first image based on the first set of bingo ball values and a first mapped bingo value index, the processor configured to determine a first payout based on the first image and a signal, where the signal indicates that there is no redraw, and the processor configured to draw a second set of bingo ball values based on a redraw signal initiated by a player and where the redraw signal initiates the drawing of the second set of bingo ball values;

wherein the first set of bingo values are generated external to the electronic gaming device via the external server; and wherein the second set of bingo values are generated internal to the electronic gaming device via the processor.

2. The electronic gaming device of claim 1, wherein the processor is further configured to display a second image based on the second set of bingo ball values and at least one of the first mapped bingo value index and a second mapped bingo value index.

3. The electronic gaming device of claim 2, wherein the processor is further configured to determine a second payout based on the second image.

4. The electronic gaming device of claim 1, wherein the processor is further configured to display a second image based on the second set of bingo ball values and a second mapped bingo value index.

5. The electronic gaming device of claim 4, wherein the first mapped bingo value index and the second mapped bingo value index are different.

6. The electronic gaming device of claim 4, wherein one or more images relate to a non-bingo game.

7. The electronic gaming device of claim 6, wherein the non-bingo game is at least one of poker, blackjack, roulette, and baccarat.

8. A method of providing gaming options via an electronic gaming device comprising:

drawing a first set of bingo ball values via an external server based on a game window determination;

receiving the first set of bingo ball values at the electronic gaming device;

mapping the first set of bingo ball values to a first bingo index value;

generating a first image based on the first bingo index value;

displaying the first image;

determining a first payout based on the first image and a signal when the signal indicates that there is no redraw; and drawing a second set of bingo ball values based on the signal indicating that a redraw request has been initiated by a player;

wherein the first set of bingo values are generated external to the electronic gaming device via the external server; and wherein the second set of bingo values are generated internal to the electronic gaming device via a processor located in the electronic gaming device.

9. The method of claim 8, further comprising mapping the second set of bingo ball values to a second bingo index value.

10. The method of claim 9, further comprising generating and displaying a second image based on the second bingo index value.

11. A method of providing gaming options comprising:

generating via one or more server processors a first bingo value index;

generating a first bingo draw via an external server;

mapping the first bingo value index to game play data;

generating a second bingo value index;

generating a second bingo draw via an electronic gaming device;

mapping the second bingo value index to game play; and storing at least one of the bingo value index, a mapped bingo value index, and a mapped game play data;

wherein the first set of bingo values are generated external to the electronic gaming device via the external server; and wherein the second set of bingo values are generated internal to the electronic gaming device via the processor located within the electronic gaming device.

12. The method of claim 11, wherein the game play data is a non-bingo game play data.

13. The method of claim 12, wherein the non-bingo game play data relates to at least one of a poker game, a blackjack game, a roulette game, and a baccarat game.

14. The method of claim 11, further comprising generating one or more images based on at least one of the bingo value index, the mapped bingo value index, and the mapped game play data.

15. The method of claim 14, further comprising storing the one or more images.

16. The method of claim 11, wherein the second bingo value index is utilized for at least a partial retriggering event.

* * * * *